US009880688B2

(12) United States Patent
Akhavan Fomani et al.

(10) Patent No.: US 9,880,688 B2
(45) Date of Patent: Jan. 30, 2018

(54) ACTIVE MATRIX CAPACITIVE SENSOR FOR COMMON-MODE CANCELLATION

(71) Applicant: SYNAPTICS INCORPORATED, San Jose, CA (US)

(72) Inventors: Arash Akhavan Fomani, Sunnyvale, CA (US); Patrick Smith, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 17 days.

(21) Appl. No.: 14/975,042

(22) Filed: Dec. 18, 2015

(65) Prior Publication Data

US 2017/0038866 A1   Feb. 9, 2017

Related U.S. Application Data

(60) Provisional application No. 62/201,154, filed on Aug. 5, 2015.

(51) Int. Cl.
*G06F 3/045* (2006.01)
*G06F 3/044* (2006.01)
*G06F 3/047* (2006.01)
*G06F 3/041* (2006.01)

(52) U.S. Cl.
CPC .............. *G06F 3/044* (2013.01); *G06F 3/047* (2013.01); *G06F 3/0416* (2013.01)

(58) Field of Classification Search
CPC ...... G06F 3/041; G06F 3/0412; G06F 3/0416; G06F 3/044; G06F 2203/0338; G09G 2300/0809; G02F 1/13338; H03K 17/962; H03K 17/9622
See application file for complete search history.

(56) References Cited

U.S. PATENT DOCUMENTS

| 4,429,413 A | 1/1984 | Edwards |
|---|---|---|
| 5,325,442 A | 6/1994 | Knapp |
| 5,978,496 A | 11/1999 | Harkin |

(Continued)

FOREIGN PATENT DOCUMENTS

WO    WO2014014785    1/2014

OTHER PUBLICATIONS

International Search Report and Written Opinion PCT/US2016/039231, dated Oct. 12, 2016, consists of 14 pages.

*Primary Examiner* — Joe H Cheng
(74) *Attorney, Agent, or Firm* — Patterson + Sheridan, LLP

(57) ABSTRACT

This disclosure generally provides an input device that includes a plurality of sensor modules coupled to sensor electrodes arranged in a matrix that measure capacitive sensing signals corresponding to the electrodes. To mitigate the effect of capacitive coupling between a sensor electrode being sensed and its neighbors in the matrix, the input device drives the neighboring electrodes in a same manner as the selected sensor electrode so that there is little or no voltage difference between the sensor electrode being sensed and its neighbors. For example, during a drive phase, the electrode being sensed and the neighboring electrodes are coupled to the same charge voltage. During a read phase, the neighboring electrodes and the selected electrode may be coupled to the same reference voltage—e.g., ground—so there is again no voltage difference between the electrodes.

21 Claims, 9 Drawing Sheets

(56) References Cited

U.S. PATENT DOCUMENTS

| | | | |
|---|---|---|---|
| 6,411,727 B1 | 6/2002 | Harkin | |
| 6,657,269 B2 | 12/2003 | Migliorato et al. | |
| 6,681,033 B1 | 1/2004 | Yano et al. | |
| 6,778,686 B1 † | 8/2004 | Hestnes | |
| 6,937,031 B2 | 8/2005 | Yoshioka et al. | |
| 7,053,633 B2 | 5/2006 | Hara | |
| 7,078,917 B2 | 7/2006 | Yoshida et al. | |
| 7,081,765 B2 | 7/2006 | Miyasaka et al. | |
| 7,091,726 B2 | 8/2006 | Sano et al. | |
| 7,126,349 B2 | 10/2006 | Hara | |
| 7,126,350 B2 | 10/2006 | Miyasaka | |
| 7,127,089 B2 | 10/2006 | Miyasaka | |
| 7,196,528 B2 | 3/2007 | Ebihara | |
| 7,683,638 B2 | 3/2010 | Chuang et al. | |
| 7,683,639 B2 | 3/2010 | Chuang et al. | |
| 7,683,640 B2 | 3/2010 | Chuang et al. | |
| 7,755,369 B2 | 7/2010 | Chuang et al. | |
| 8,711,128 B2 | 4/2014 | Small et al. | |
| 8,766,950 B1* | 7/2014 | Morein | G06F 3/044 345/173 |
| 9,152,841 B1 † | 10/2015 | Riedijk | |
| 2004/0169755 A1* | 9/2004 | Shinotsuka | H01L 27/14643 348/308 |
| 2005/0163351 A1* | 7/2005 | Kim | G06K 9/0002 382/124 |
| 2008/0007507 A1 | 1/2008 | Kim et al. | |
| 2010/0072471 A1 | 3/2010 | Yamazaki et al. | |
| 2010/0079433 A1* | 4/2010 | Ishiguro | G09G 3/3233 345/211 |
| 2010/0098303 A1 | 4/2010 | Chen | |
| 2010/0193257 A1* | 8/2010 | Hotelling | G06F 3/0412 178/18.06 |
| 2010/0219845 A1 | 9/2010 | Easter | |
| 2011/0090184 A1 | 4/2011 | Yamazaki et al. | |
| 2011/0122059 A1 † | 5/2011 | Guerrero | |
| 2011/0298746 A1* | 12/2011 | Hotelling | G06F 3/0418 345/174 |
| 2012/0206154 A1* | 8/2012 | Pant | G06F 3/0416 324/613 |
| 2013/0057511 A1* | 3/2013 | Shepelev | G06F 3/044 345/174 |
| 2013/0141363 A1* | 6/2013 | Hung | G06F 3/0488 345/173 |
| 2013/0215075 A1* | 8/2013 | Lee | G06F 3/044 345/174 |
| 2013/0249850 A1* | 9/2013 | Bulea | G06F 3/044 345/174 |
| 2013/0314148 A1 | 11/2013 | Kang et al. | |
| 2014/0146000 A1 | 5/2014 | Jo et al. | |
| 2014/0266262 A1 | 9/2014 | Taghibakhsh | |
| 2014/0354596 A1 | 12/2014 | Djordjev et al. | |
| 2015/0077389 A1 | 3/2015 | Ding et al. | |
| 2015/0091850 A1* | 4/2015 | Morein | G06F 3/0412 345/174 |
| 2015/0116246 A1* | 4/2015 | Nagata | G06F 3/041 345/173 |
| 2015/0177868 A1* | 6/2015 | Morein | G06F 3/044 345/174 |
| 2015/0212623 A1* | 7/2015 | Hatano | G06F 3/044 345/174 |
| 2015/0277618 A1* | 10/2015 | Bulea | G06F 3/0418 345/174 |
| 2015/0378467 A1 | 12/2015 | Hoch | |
| 2015/0378495 A1* | 12/2015 | Losh | G06F 3/0416 345/174 |
| 2016/0092000 A1* | 3/2016 | Morein | G06F 3/044 345/174 |
| 2016/0155381 A1* | 6/2016 | Kwon | G09G 3/3233 345/215 |
| 2017/0052640 A1* | 2/2017 | Day | G06F 3/0414 |

\* cited by examiner
† cited by third party

ACTIVE MATRIX CAPACITIVE SENSOR FOR COMMON-MODE CANCELLATION

CROSS-REFERENCE TO RELATED APPLICATIONS

This application is a non-provisional of U.S. provisional patent application Ser. No. 62/201,154, filed Aug. 5, 2015. The aforementioned related patent application is herein incorporated by reference in its entirety.

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. In one example, the sensing region includes sensing electrodes used to measure changes in capacitance resulting from an input object (e.g., a finger or stylus) interacting with the sensing region. However, common mode coupling due to capacitance between a sensing electrode and neighboring sensing electrodes can interfere with measuring capacitance values between the sensing electrode and the input object. In addition, the input device may have parasitic capacitances corresponding to an output line used to drive signals on the sensing electrode which can be orders of magnitude larger than the capacitance between the sensing electrode and the input object. The effects of the common mode coupling and the parasitic capacitance make measuring the smaller capacitance between the sensing electrode and the input object more difficult.

BRIEF SUMMARY OF THE INVENTION

One embodiment described herein is a processing system for performing capacitive sensing. The processing system includes selection logic configured to apply, during a first time period, a charging voltage to a first sensor electrode and a second sensor electrode where the second sensor electrode neighbors the first sensor electrode in a sensor electrode matrix. The processing system includes a sensor circuit configured to measure, during a second time period, a first charge stored on the first sensor electrode resulting from applying the charging voltage where the selection logic is configured to bias the second sensor electrode to a reference voltage during the second time period.

Another embodiment described herein is an input device that includes a plurality of sensor electrodes arranged in a matrix. The input device includes a processing system configured to apply, during a first time period, a charging voltage to a first sensor electrode and a second sensor electrode neighboring the first sensor electrode in the matrix, measure, during a second time period, a first charge stored on the first sensor electrode resulting from applying the charging voltage, and bias the second sensor electrode to a reference voltage during the second time period.

Another embodiment described herein is a method for performing capacitive sensing. The method includes applying, during a first time period, a charging voltage to a first sensor electrode and to a second sensor electrode neighboring the first sensor electrode in a sensor electrode matrix, measuring, during a second time period, a first charge stored on the first sensor electrode resulting from applying the charging voltage, and biasing the second sensor electrode to a reference voltage during the second time period.

Another embodiment described herein is an input device that includes a plurality of sensor electrodes arranged in a matrix. The input device includes first and second row select lines selectively coupling first and second sensor electrodes in the matrix to a first data line. The input device also includes a processing system configured to apply, during a first time period, a charging voltage to the first sensor electrode using the first data line, apply, during the first time period, the charging voltage to a third sensor electrode in the matrix using a second data line, and measure, during a second time period, a charge stored on the first sensor electrode resulting from applying the charging voltage using the first data line where the second sensor electrode and third sensor electrode are electrically floating during the second time period.

BRIEF DESCRIPTION OF DRAWINGS

An exemplary embodiment of the present invention will hereinafter be described in conjunction with the appended drawings, where like designations denote like elements, and.

DETAILED DESCRIPTION

Figure 1:
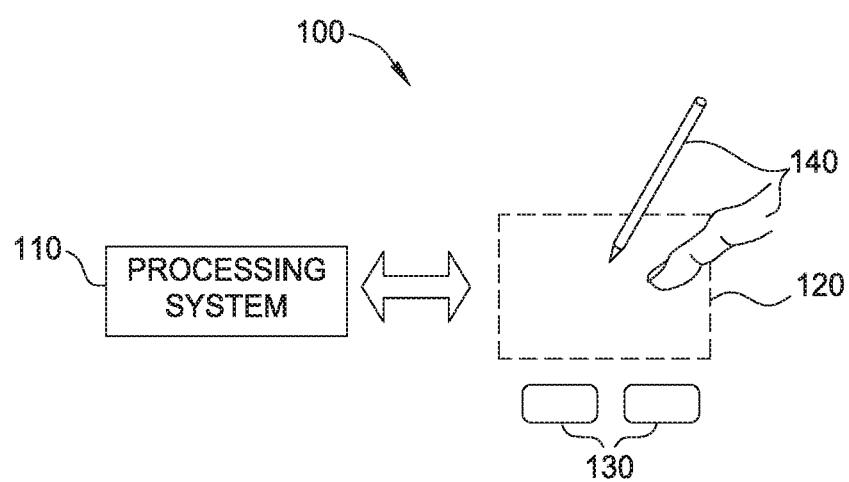
FIG. 1 is a block diagram of an exemplary system that includes an input device in accordance with an embodiment of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability. In one embodiment, the input device includes a matrix sensor that includes a plurality of sensor electrodes arranged in rows on a common surface or plane. The input device may include a plurality of sensor modules coupled to the sensor electrodes that measure capacitive sensing signals corresponding to the electrodes. During a charge phase, the input device applies a charging voltage to at least one of the electrodes in the matrix sensor. The amount of charge accumulated on the selected sensor electrode depends on the capacitive coupling between the sensor electrode and an input object (e.g., a finger). During a read phase, the input device measures the amount of charge accumulated on the sensor electrode during the charge phase. In one embodiment, the measured charge can be correlated to a particular feature of an input object. For example, when used as a fingerprint sensor, the input device can detect valleys and ridges in a finger depending on the measured charge.

The capacitive coupling between a selected sensor electrode and the input object, however, is not the only capacitance that can affect the amount of charge stored on the electrode during the charge phase. The capacitive coupling between the selected electrode and the neighboring sensor electrodes in the matrix sensor when used as a fingerprint sensor can be on the same order of magnitude as the difference of the capacitive coupling between a ridge in the finger to the selected electrode and the capacitive coupling between a valley in the finger to the selected electrode. Because this capacitive coupling can make measuring the charge attributable to the capacitive coupling to the input object more difficult, embodiments herein drive the neighboring electrodes in the same manner as the selected sensor electrode. In one embodiment, during the charge phase, the selected electrode and the neighboring electrodes are coupled to the charge voltage. Because there is no voltage difference between these electrodes, the capacitive coupling to the neighboring electrodes does not affect the amount of charge stored on the selected electrode during the charge phase. Similarly, during the read phase, the neighboring electrodes and the selected electrode may be coupled to the same reference voltage—e.g., ground—so there is again no voltage difference between the electrodes. In this manner, the effects of the parasitic capacitance between the selected sensor electrode and its neighbors can be mitigated or removed.

In another embodiment, instead of applying the same voltages to the selected and neighboring electrodes during the charge and read phases, the input device floats the neighboring electrodes. During the charge phase a charge accumulates on the selected electrodes because of the capacitance coupling between the selected and neighboring electrodes; however, this charge is not read out during the read phase because the selected and neighboring electrodes are biased at zero. As a result, the same magnitude but opposite polarity of the charge is transferred to the neighboring pixel. Thus, if the neighboring charge is floating, the net charge that flows in and out of the selected electrode during the charge and read phases is zero.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1. In one embodiment, the input device 100 is a fingerprint sensor that senses the different features in a finger such as ridges and valleys which can be used to form a fingerprint. The fingerprint sensor may be a swipe sensor, where a fingerprint image is reconstructed from a series of scans as the user moves their finger over the sensor, or a placement sensor, where a sufficient area of the fingerprint can be captured from a single scan as the user holds her finger at a fixed location in the sensing region 120.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. In another embodiment, the sensing region 120 has a circular shape that conforms to the shape of a fingertip.

The input device 100 may utilize any combination of sensor components and sensing technologies to detect user input in the sensing region 120. The input device 100 comprises one or more sensing elements for detecting user input.

Some implementations are configured to provide images that span one, two, three, or higher dimensional spaces.

Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes (e.g., unlocking the user device or providing access to secure data using a detected fingerprint), as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
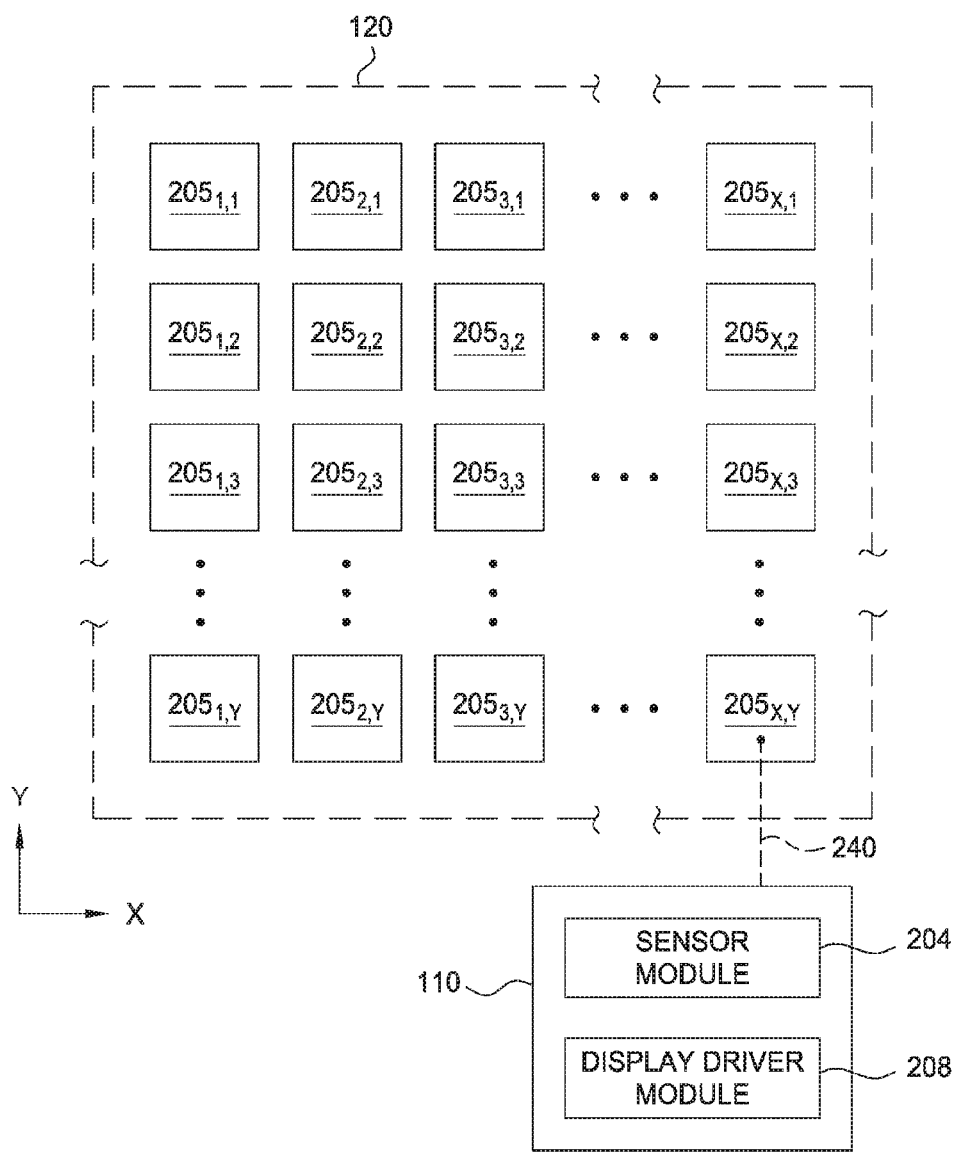
FIG. 2 is input device that includes a matrix sensor arrangement in accordance with an embodiment of the invention.

FIG. 2 shows a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensing elements described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device or to detect ridges and valleys when used as a fingerprint sensor.

The exemplary pattern comprises an array of capacitive sensing pixels 205X,Y (referred collectively as pixels 205) arranged in X columns and Y rows in a common plane, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, non-concave concave, etc. As shown here, the sensing pixels 205 are coupled to the processing system 110.

In a first mode of operation, at least one sensor electrode within the capacitive sensing pixels 205 may be utilized to detect the presence of an input object via absolute sensing techniques. A sensor module 204 (e.g., a sensor circuit) in processing system 110 is configured to drive a sensor electrode using a trace 240 in each pixel 205 with a capacitive sensing signal (which can be modulated or unmodulated) and measure a capacitance between the sensor electrode and the input object (e.g., free space or earth ground) based on the capacitive sensing signal, which is utilized by the processing system 110 or other processor to determine the position of the input object or features in a finger.

The various electrodes of capacitive pixels 205 are typically ohmically isolated from the electrodes of other capacitive pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" pixels 205 to determine these capacitive coupling includes driving with a modulated signal and measuring the absolute capacitance of one or more of the sensor electrodes. In another embodiment, the sensor electrodes may be operated such that the modulated signal is driven on a sensor electrode in multiple capacitive pixels 205 at the same time. In such embodiments, an absolute capacitive measurement may be obtained from each of the one or more pixels 205 simultaneously. In one embodiment, the input device 100 simultaneously drives a sensor electrode in a plurality of capacitive pixels 205 and measures an absolute capacitive measurement for each of the pixels 205 in the same sensing cycle. In various embodiments, processing system 110 may be configured to selectively drive and receive with a portion of sensor electrodes. For example, the sensor electrodes may be selected based on, but not limited to, an application running on the host processor, a status of the input device, an operating mode of the sensing device and a determined location of an input object. In another embodiment, the input object (e.g., a finger) is the transmitter that is driven with the modulated signal while the sensor electrode is a receiver.

A set of measurements from the capacitive pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the capacitive pixels 205 include one or more display electrodes used in updating the display of the display screen. In one or more embodiments, the display electrodes comprise one or more segments of a Vcom electrode (common electrodes), a source drive line, gate line, an anode electrode or cathode electrode, or any other display element. These display electrodes may be disposed on an appropriate display screen substrate. For example, the electrodes may be disposed on the a transparent substrate (a glass substrate, TFT glass, a plastic substrate or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

Continuing to refer to FIG. 2, the processing system 110 coupled to the sensing electrodes includes a sensor module 204 and optionally, a display driver module 208. In one embodiment the sensor module comprises circuitry configured to drive a transmitter signal onto and receive resulting signals with the resulting signals the sensing electrodes during periods in which input sensing is desired. In one embodiment the sensor module 204 includes a transmitter module including circuitry configured to drive a transmitter signal onto the sensing electrodes during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor module 204 may be selectively coupled to one or more of the sensor electrodes in the capacitive pixels 205. For example, the sensor module 204 may be coupled to selected portions of the sensor electrodes and operate in either an absolute or transcapacitance sensing mode. In another example, the sensor module 204 may be coupled to different sensor electrodes when operating in the absolute sensing mode than when operating in the transcapacitance sensing mode.

In various embodiments the sensor module 204 may comprise a receiver module that includes circuitry configured to receive a resulting signal with the sensing electrodes comprising effects corresponding to the transmitter signal during periods in which input sensing is desired. In one or more embodiments, the receiver module is configured to drive a modulated signal onto a first sensor electrode in one of the pixels 205 and receive a resulting signal corresponding to the modulated signal to determine changes in absolute capacitance of the sensor electrode. The receiver module may determine a position of the input object in the sensing region 120 or may provide a signal including information indicative of the resulting signal to another module or processor, for example, a determination module or a processor of the electronic device (i.e., a host processor), for determining the position of the input object in the sensing region 120. In one or more embodiments, the receiver module comprises a plurality of receivers, where each receiver may be an analog front ends (AFEs).

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display driver module 208 includes circuitry confirmed to provide display image update information to the display of the display device during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver module 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

Figure 3:
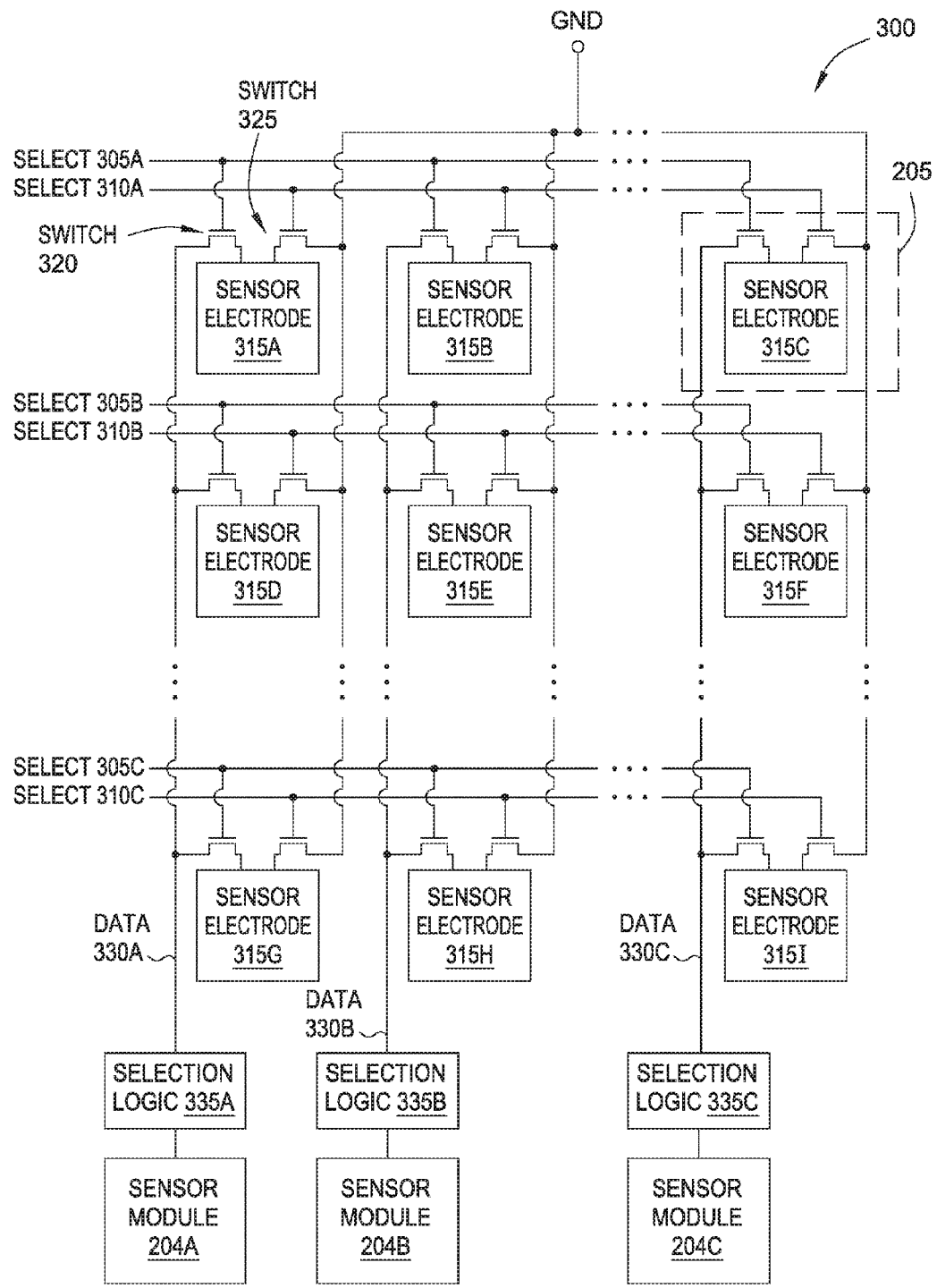
FIG. 3 illustrates a sensor layout for detecting an input object in accordance with an embodiment of the invention.

FIG. 3 illustrates a sensor layout for a fingerprint sensor 300 for detecting an input object in accordance with an embodiment of the invention. Although the discussion that follows describes the sensor layout being used in a fingerprint sensor 300, the embodiments are not limited to such. In other embodiments, the components illustrated in FIG. 3 may be used in a capacitive sensing sensor for detecting a position of an input object in a sensing region, whether an input object is hovering over a touch surface, palm print, or hand geometry.

As shown, the fingerprint sensor 300 includes multiple sensor electrodes 315 which may each form a capacitive sensing pixel 205 as described above. The sensor electrodes 315 are arranged to form a fingerprint sensor array. As shown, the sensor electrodes 300 are arranged in a matrix pattern and may be co-planar and disposed on a common plane or substrate. In one embodiment, the width and height of the sensor electrodes 315 may range from 5 microns to 70 microns. Furthermore, the pitch between the sensor electrodes 315 is set to enable the sensor 300 to detect features in a finger such as valleys and ridges. For example, the pitch between sensors 315 may range from 5 to 100 microns.

Each sensor electrode 315 is coupled to respective switches 320, 325 (e.g., transistors). The switches 320, 325 are controlled (i.e., activated and deactivated) by row select lines 305 and row select lines 310. As shown, each row in the sensor 300 includes a respective pair of the select lines 305 and 310. For example, each of the switches 320 and 325 in the upper row are respectively coupled to select lines 305A and 310A. The switches 320 and 325 in the middle row are respectively coupled to select lines 305B and 310B, and so forth.

In one embodiment, the sensor electrodes 315 are disposed on a different substrate in fingerprint sensor 300 than the switches 320, 325 and the select lines 305, 310. For example, the electrodes 315 may be disposed on a first substrate above a second substrate on which the switches 320, 325 are disposed in a display stack. The first substrate may include through vies to electrically couple the electrodes 315 to the switches 320, 325. In another embodiment, the sensor electrodes 315, switches 320, 325, and select lines 305, 310 are disposed on a common substrate. For example, these components may be disposed on the same side of the common substrate. However, in another example, the sensor electrodes 315 may be disposed on a first side of the common substrate while the switches 320, 325 and select lines 305, 310 are disposed on a second, opposite side of the common substrate.

In one embodiment, the switches 320, 325 are formed using thin-film-transistors (TFT). However, in another embodiment, the switches 320, 325 may be implemented using CMOS transistors. As such the fingerprint sensor 300 may be used in a display stack where switches 320, 325 and sensor electrodes 315 are formed using transparent materials (e.g., TFT) or the sensor 300 may be used outside a display stack where the switches 320, 325 or sensor electrodes 315 are not transparent (e.g., CMOS technologies).

The select lines 305, 310 activate the switches 320, 325 thereby connecting the sensor electrodes 315 to either a data line 330 or to a ground (GND) network. While the switches 320, 325 in the same row of electrodes 315 are all coupled to the same pair of select lines 305, 310, the switches 320 in the same column of electrodes 315 are all coupled to the same data line 330 (also referred to as an output line). When select line 305A activates the switches 320 in the upper row, each of the electrodes 315 in the upper row (i.e., electrodes 315A, 315B, and 315C) are coupled to their respective data lines 330. If only one of the select lines 305 is active at any given time, then only one electrode 315 in each column is coupled to a data line 330. For example, if select line 305A is high, but select lines 305B and 305C are low, then only sensor electrodes 315A-C are coupled to the data lines 330 while electrodes 315D-I are not.

When a select line 310 is active, all the sensor electrodes 315 in the corresponding row are coupled to GND. In one embodiment, the timing of select lines 305 and 310 is synchronized so that the select lines 305, 310 corresponding to the same electrode 315 are not active at the same time. Stated differently, in one embodiment, no electrode 315 is simultaneously coupled to both the GND network and a data line 330. The specific timings used to control the switches 320, 325 and perform capacitive sensing using the sensor electrodes 315 is described in detail below.

Each data line 330 is coupled to a respective selection logic 335 which permits different voltages to be driven onto the data lines 330. The selection logic 335 is in turn coupled to sensor modules 204. In one embodiment, the sensor modules 204 are circuits that include receivers for measuring charge on a sensor electrode 315 in order to perform capacitive sensing. Although fingerprint sensor 300 includes a one-to-one correlation between the data lines 330 and the sensor modules 204, in other embodiments, multiple data lines 330 may be multiplexed to the same sensor module 204. Stated differently, multiple columns of sensor electrodes 315 may be selectively coupled to the same sensor module 204 which may save space and reduce costs.

Figure 4:
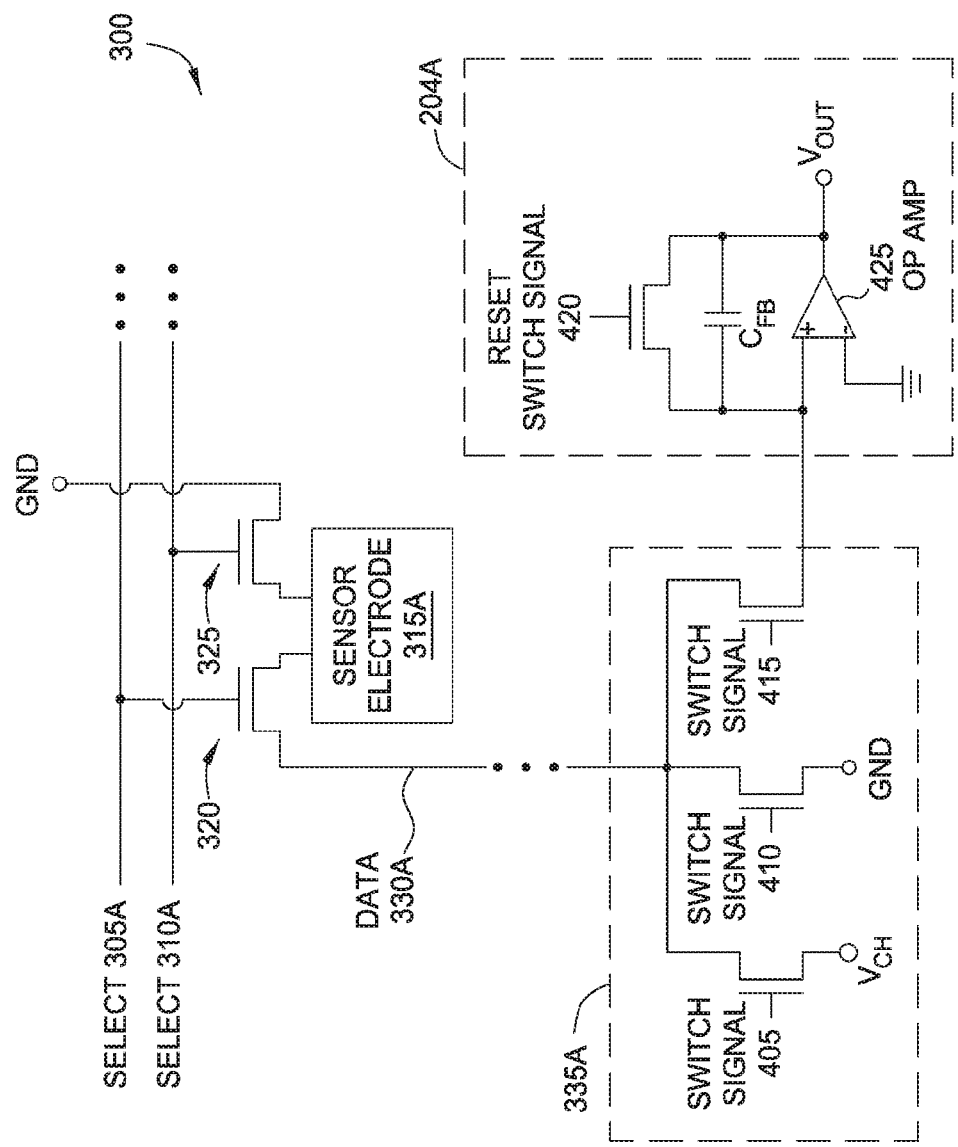
FIG. 4 illustrates a sensor module for detecting an input object in accordance with an embodiment of the invention.

FIG. 4 illustrates the sensor module 204A which is selectively coupled to sensor electrode 315A. The same arrangement shown here may be reproduced for each of the sensor electrodes 315 in the sensor 300. As shown, the data line 330A is coupled to three switches in the selection logic 335A which are activated using switch signal 405, switch signal 410, and switch signal 415. In one embodiment, the processing system controls the switch signals 405, 410, and 415 such that at most one of the signals is active at any given time. If switch signal 405 is active, the data line 330A is coupled to a charging voltage ($V_{CH}$). If switch signal 410 is active, the data line 330A is coupled to GND. If switch signal 415 is active, the data line 330A is coupled to the sensor module 204A. Moreover, if the select line 305A activates the switch 320, then any voltage driven onto the data line 330A is also driven onto the sensor electrodes 315A. Further, when measuring the charge on the sensor electrode 315A, the data line 330A and the transistor coupled to switch signal 415 provide a conductive path from the sensor electrodes 315A to the sensor module 204A. Although the voltage source $V_{CH}$ and GND are shown as part of the selection logic 335A, in other embodiments, these voltage networks may be part of the sensor module 204A.

The sensor module 204A includes an operational amplifier 425, feedback capacitor ($C_{FB}$), and a reset switch that is activated using the reset switch signal 420. When measuring charge on the sensor electrodes 315A, the reset switch signal 420 is LOW to prevent the input and output of the amplifier 425 from being short circuited. In operation, the charge on the sensor electrode 315A is transferred to the $C_{FB}$ which can be measured and processed using, for example, a determination module coupled to the sensor module 204A.

In one embodiment, the amount of charge on the sensor electrode 315A varies depending on the capacitive coupling between the sensor electrode 315A and an input object (e.g., a finger). For example, during a first time period, the sensor electrode 315A is coupled to the charging voltage $V_{CH}$ via the data line 330A and selection logic 335A. The amount of charge accumulated on the sensor electrode 315A during the first time period depends on the capacitive coupling between the finger and the electrode 315A. During a second time period, the selection logic 335 couples the sensor electrode 315A to the sensor module 204A which measures the amount of charge that was accumulated on the sensor electrode 315A during the first time period. Once this charge (or a change in charge) is determined, the fingerprint sensor 300 can determine the capacitive coupling between the electrode 315A and the finger which can indicate, for example, if a ridge or a valley of the finger is disposed over the electrode 315A.

However, the capacitance between the electrode 315A and the input object (finger) is not the only capacitance in the fingerprint sensor 300. There is also capacitive coupling between the sensor electrode 315A and neighboring electrodes (not shown in FIG. 4). In fact, this capacitive coupling may be orders of magnitude larger than the difference of the capacitive coupling between a ridge in the finger to the electrode 315A and the capacitive coupling between a valley in the finger to the electrode 315A. Moreover, capacitive coupling from the data line 330A (and other neighboring data lines 330) to the sensor electrode 315A may also affect how much charge is accumulated on the sensor electrode 315A during the first time period. These capacitive couplings are collectively referred to herein as parasitic capacitances which make detecting the capacitive coupling between the input object and the sensor electrode 315A more difficult to measure.

As used herein, a neighboring sensor electrode is a sensor electrode whose capacitive coupling to the electrode to be sensed interferes with the ability of a sensor module to measure a desired capacitance between the selected electrode and the input object. For example, when used as a fingerprint sensor, a neighboring sensor electrode may be a sensor electrode whose capacitive coupling to the selected electrode is at least on the same order of magnitude as the difference of the capacitive coupling between a ridge in the finger to the selected electrode and the capacitive coupling between a valley in the finger to the select electrode. Moreover, an adjacent sensor electrode is an electrode that is directly next to the sensed electrode in the matrix, either at an angle of along a row or column. For example, referring to FIG. 3, sensor electrode 315C can be a neighboring electrode to sensor electrode 315A even though electrode 315C is not directly adjacent to sensor electrode 315A.

In one embodiment, the fingerprint sensor 300 operates by sensing the charge accumulated on the sensor electrode 315A due to voltage difference between a finger and the sensor electrode 315A. However, as mentioned above, the parasitic capacitances, especially the coupling capacitance to neighboring sensor electrodes 315, also affect the amount of charge accumulated on the sensor electrode 315A. Equation 1 illustrates the relationship between these capacitances and the amount of charge that accumulates on the electrode 315A:

$$Q_{315A} = \Sigma_{315A} C_{neighbor}(V_{315A} - V_{neighbor}) + C_F V_{315A} \quad (1)$$

In Equation 1, $Q_{315A}$ is the charge accumulated on electrode 315A, $C_{neighbor}$ is the capacitive coupling between electrode 315A and one of the neighboring electrodes in the sensor 300 (and will vary depending on the spatial relationship of the neighboring electrode to electrode 315A), $V_{315A}$ is the voltage on the sensor electrode 315A, $V_{neighbor}$ is the voltage on the neighboring electrode, and $C_F$ is the capacitive coupling between the sensor electrode 315A and the finger. As shown, the charge (Q) on the electrode 315A depends on the voltage difference between the sensor electrode 315A and all the neighboring electrodes to which it is capacitively coupled. Stated differently, if there is a voltage difference between the sensor electrode 315A and the neighboring electrodes, the sum of the capacitive couplings between the sensor electrode 315A the neighboring electrodes affect charge accumulation on electrode 315A.

The present disclosure uses common mode cancellation to remove or mitigate the effects of the parasitic capacitance between the sensor electrodes 315A and its neighbors—i.e., the sensor electrodes to which the electrode 315A is capacitively coupled. To do so, the fingerprint sensor 300 ensures there is no voltage difference between the sensor electrode 315A and its neighboring electrodes. If the voltage difference is zero, the summation ($\Sigma$) portion of Equation 1 goes to zero, meaning the charge accumulated on sensor electrode 315A is affected only by the capacitance coupling to the input object—i.e., $C_F$. The effect of common mode cancellation is illustrated by Equation 2:

$$Q_{315A} = C^F V_{315A} \quad (2)$$

As shown by Equation 2, a significant reduction in common mode voltage can be achieved by reducing or eliminating the voltage difference between sensor electrode 315A (i.e., the electrode being sensed) and the neighboring electrodes.

Figure 5:
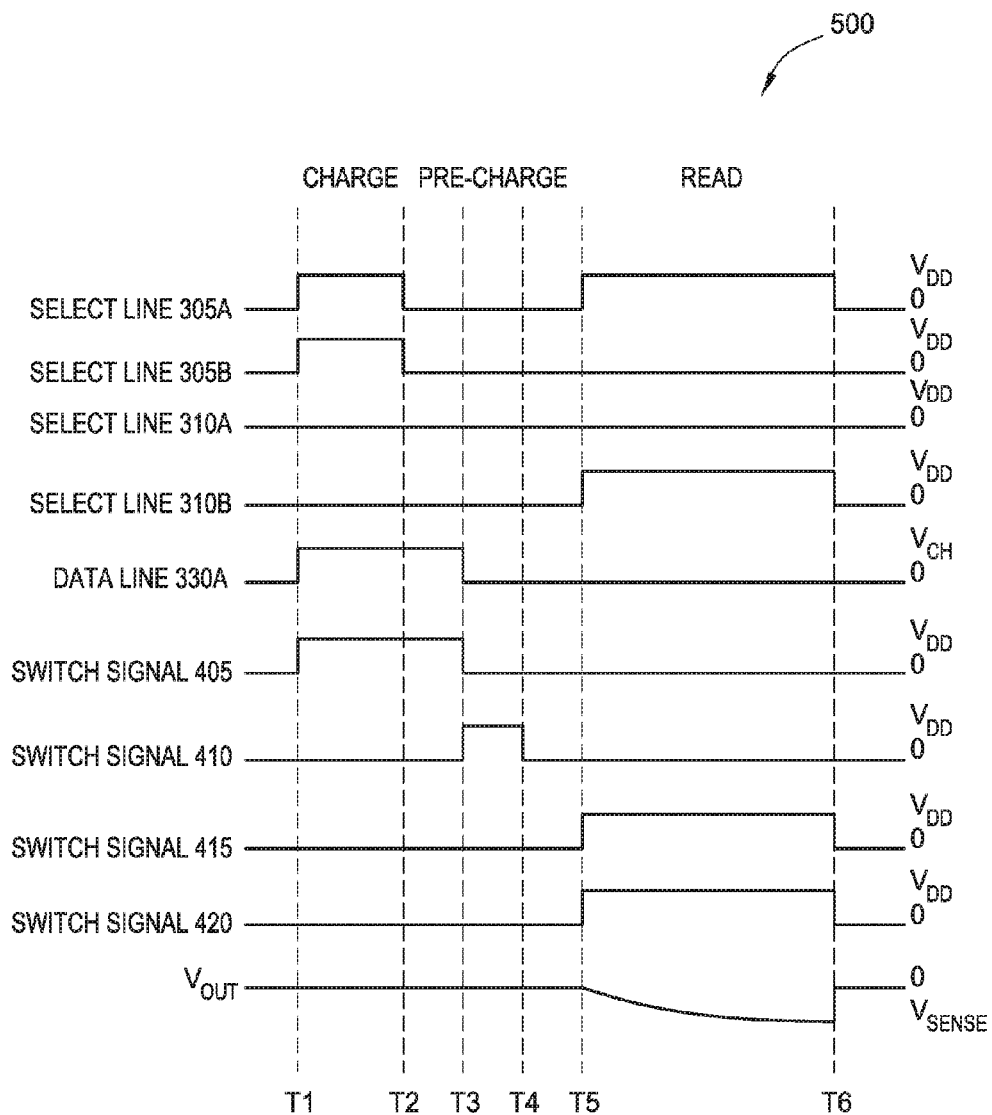
FIG. 5 is a timing diagram corresponding to the circuitry in FIGS. 3 and 4 in accordance with an embodiment of the invention.

FIG. 5 is a timing diagram 500 corresponding to the circuitry in FIGS. 3 and 4 for mitigating common mode voltage between a sensed electrode and neighboring electrodes. Specifically, the timing diagram 500 illustrates the timing of the signal lines coupled to sensor electrode 315A and sensor electrode 315D which are in the same column but adjacent rows in the fingerprint sensor 300 shown in FIG. 3. Moreover, the sensor electrode 315A is also referred to herein as the "sensed electrode" while sensor electrode 315D is also referred to as the "neighboring electrode."

At time T1, the select line 305A coupled to sensor electrodes 315A-C and the select line 305B coupled to sensor electrodes 315D-F both go HIGH which activate the switches 320 in the upper and middle rows of sensor 300. As a result, both sensor electrode 315A and second electrode 315D are coupled to the data line 330A. Moreover, the switch signal 405 in the selection logic 335A also goes HIGH which causes the charging voltage $V_{CH}$ to be driven onto the data line 330A and both sensor electrode 315A and sensor electrode 315D. Thus, from time T1 to T2 (i.e., the CHARGE phase), the sensed electrode and a neighboring electrode are driven to the charging voltage $V_{CH}$. Thus, by the end of the CHARGE phase, there is no voltage difference between the sensed electrode and its neighboring electrodes.

Because the select lines 305A and 305B control all the switches 320 in the upper and middle row, at time T1, all the sensor electrodes 315 in these rows are coupled to their respective data lines 330. If desired, the corresponding switch signals 405 for these data lines 330 may also couple the remaining sensor electrodes 315 in the upper and middle rows to the charging voltage $V_{CH}$. Thus, in this manner, at least by the end of T2, there is no voltage difference between the sensed electrode and its neighboring electrodes. Referring back to Equation 1, because the voltage on the sensed electrode and the neighboring electrodes is the same, then the effect of the parasitic capacitance between the sensed electrode (i.e., electrode 315A) and the neighboring electrode on the charge accumulated on the sensed electrode during time T1 to T2 is mitigated or removed.

In one embodiment, instead of using the switch signal 405 and the charge voltage source to store charge, the electrode may instead be coupled to the operation amplifier 425 which is configured to drive the voltage $V_{CH}$ onto the electrodes.

At time T2, the CHARGE phase ends and a LINE PRE-CHARGE phase begins. During this time period, the select lines 305A and 305B go LOW thereby disconnecting electrodes 315A and 315D from the data line 330A. However, from time T2 to T3, the switch signal 405 continues to be HIGH which means the data line 330A remains coupled to the charging voltage $V_{CH}$. This time interval prevents discharging the electrode if $V_{CH}$ is switched off. If $V_{CH}$ is constant, this time interval may not be needed. Moreover, during the PRE-CHARGE phase, the sensor electrodes 315A and 315D are electrically floating which means they substantially retain the charge accumulated during the CHARGE phase (minus any leakage current through the switches 320, 325).

At time T3, the switch signal 405 goes LOW thereby disconnecting the data line 330A from the charging voltage $V_{CH}$. At the same time, the switch signal 410 goes HIGH thereby connecting the data line 330A to GND. Doing so removes any charge built up on the data line 330A during times T1-T3. At time T4, the switch signal 410 goes LOW thereby disconnecting the data line 330A from GND. Thus, from time T4 to T5, the data line 330A as well as electrodes 315A and 315D are electrically floating. This portion of the PRE-CHARGE phase may be used to allow signals to settle before measuring the charge on the sensed electrode.

At time T5, the select line 305A goes HIGH which connects sensor electrode 315A to data line 330A. However, select line 305B remains LOW which means sensor electrode 315D is not connected to the data line 330A. In one embodiment, all of the select lines 305 except the one corresponding to the row that contains the sensed electrode are low at T5 so that only one of the sensor electrodes in a column is coupled to the data line 330 for that column. Stated differently, at T5, sensor electrode 315A is coupled to data line 330A while the other sensor electrodes in the same column—i.e., sensor electrodes 315D and 315G—are disconnected from data line 330A.

In addition to connecting sensor electrode 315A to the data line 330A, the switch signal 415 goes HIGH thereby connecting the sensor electrode 315A to the operational amplifier 425 in the sensor module 204A. Because the positive input of the amplifier 425 is coupled to GND, the amplifier drives the voltage on the sensor electrode 315A to ground (or other reference voltage) thereby depleting the charge accumulated on the electrode 315A during the CHARGE phase at time T1-T2. As discussed above, because the reset switch signal 420 (not shown) is high, the charge on the sensor electrode 315A transfers to the feedback capacitor $C_{FB}$ and alters the output voltage ($V_{OUT}$) of the sensor module 204A. Moreover, since any charge on the data line 330A was depleted during the PRE-CHARGE phase, only the charge on the sensor electrode 315A is measured. Using $V_{OUT}$, a determination module can identify a presence of an input object or specific features on an input object—e.g., ridges and valleys on a finger.

In addition, at time T5, the select line 310B goes high thereby activating the switches 325 in the middle row and coupling all the electrodes in the middle row (i.e., sensor electrodes 315D-F) to GND. Thus, both the sensed electrodes and the neighboring electrodes are coupled to the same reference voltage during the READ phase—i.e., GND. As such, while sensor module 204A measures the charge on sensor electrode 315A, the sensor electrodes 315A and 315D are at the same voltage at least by the end of the READ phase at T6—i.e., there is no voltage difference between the sensed electrode and its neighboring electrodes. Again referring to Equation 1, because the voltage difference between the sensed electrode and the neighboring electrodes is zero (i.e., both electrodes are driven to GND), the transfer of the charge $Q_{315A}$ from the sensor electrode 315A to the feedback capacitor $C_{FB}$ is not affected by the parasitic capacitance between electrodes 315A and 315D. Instead, this charge transfer is affected primarily by the coupling capacitance $C_F$ between sensor electrode 315A and the finger. Stated differently, driving the electrodes 315A and 315D to the same reference voltage during this time means any effect caused by the parasitic capacitance between electrodes 315A and 315D on the output voltage $V_{OUT}$ of operational amplifier 425 is mitigated or removed.

Figure 6A:
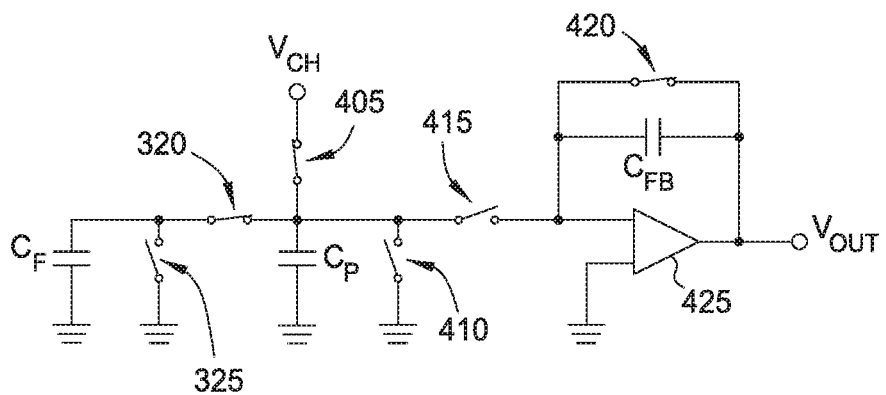
FIGS. 6A-6C illustrate equivalent circuit diagrams of a portion of the sensor layout in FIG. 3 in accordance with an embodiment of the invention.
Figure 6B:
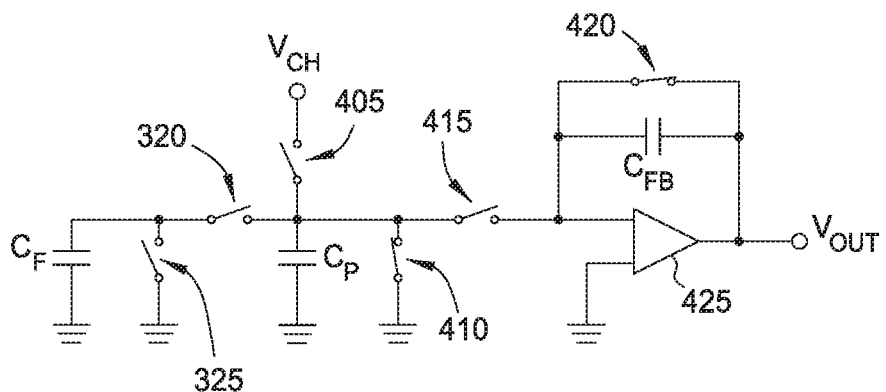
Figure 6C:
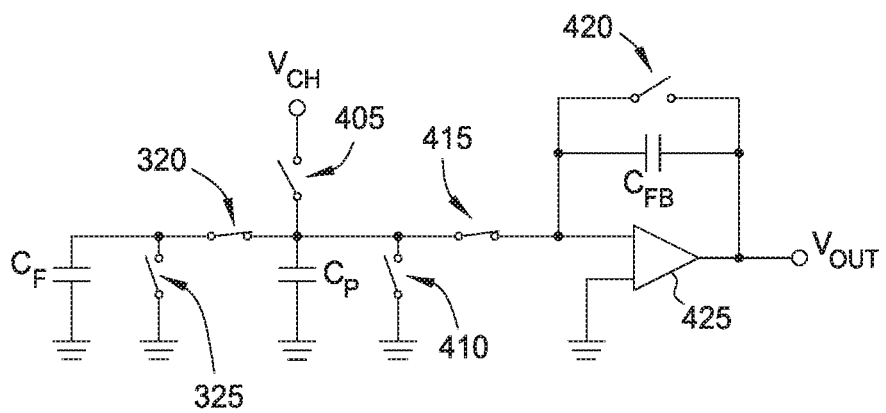

FIGS. 6A-6C illustrate equivalent circuit diagrams of a portion of the sensor layout in FIG. 3. Specifically, FIG. 6A illustrates a state of the circuitry shown in FIG. 4 when performing the CHARGE phase. As shown, the switch 320 is closed (i.e., activated) while the switch 325 is open which means the sensor electrode 315A is coupled to the data line 330A. Moreover, the switching signal 405 is HIGH which connects both the data line 330A and the sensor electrode 315A to the charge voltage $V_{CH}$. The parasitic capacitances of the output line are lumped into the capacitance $C_P$. In addition, the switching signals 410 and 415 are LOW thereby preventing the data line 330A from being coupled to GND.

In one embodiment, the gain of the amplifier 425 is set to mitigate the effect of the capacitance $C_P$ on the charge stored on the sensor electrode. As the gain of the amplifier 425 increases, the charge transferred from the sensor electrode to the parasitic capacitance $C_P$ during the READ phase becomes negligible compared to the charge transferred to the feedback capacitor $C_{FB}$. Hence, any effect caused by the parasitic capacitance between the data lines and ground can be mitigated or removed by having an operational amplifier 425 with sufficiently high gain.

FIG. 6B illustrates a state of the circuitry shown in FIG. 4 when performing the PRE-CHARGE phase. Here, switches 320 and 325 are open which disconnect the data line 330A from the charging voltage. Instead, the switching signal 410 is HIGH thereby connecting the data line 330A to GND which depletes the charge on the data line 330A but leaves the charge on the sensor electrode 315A.

FIG. 6C illustrates a state of the circuitry shown in FIG. 4 when performing the READ phase. In this scenario, switch 320 coupling sensor electrode 315A to the data line 330A is again active which ohmically couples these two elements. However, the switch signal 410 is LOW thereby disconnecting the data line 330A from GND, but the switch signal 415 is HIGH which connects the data line 330A to the operational amplifier 425. As discussed above, using the capacitance $C_{FB}$, the amplifier 425 outputs a voltage which varies according to the amount of charge that was accumulated on the sensor electrode 315A during the CHARGE phase.

Figure 7A:
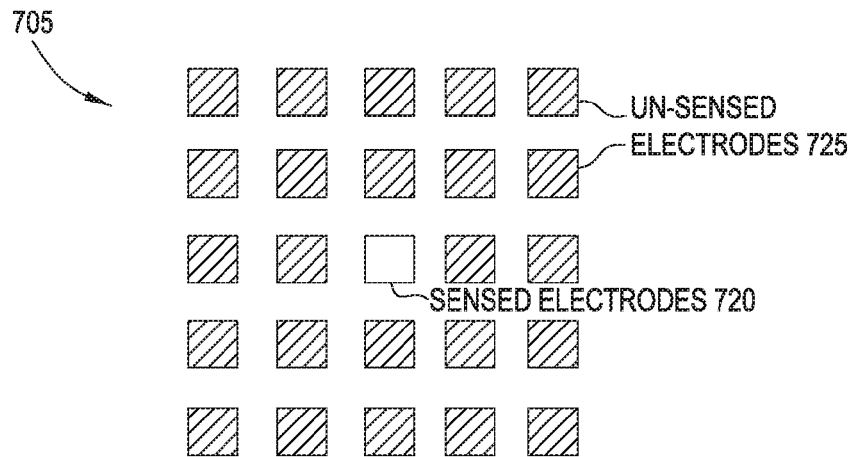
FIGS. 7A-7C illustrate sensing patterns for operating sensor electrodes in accordance with an embodiment of the invention.
Figure 7B:
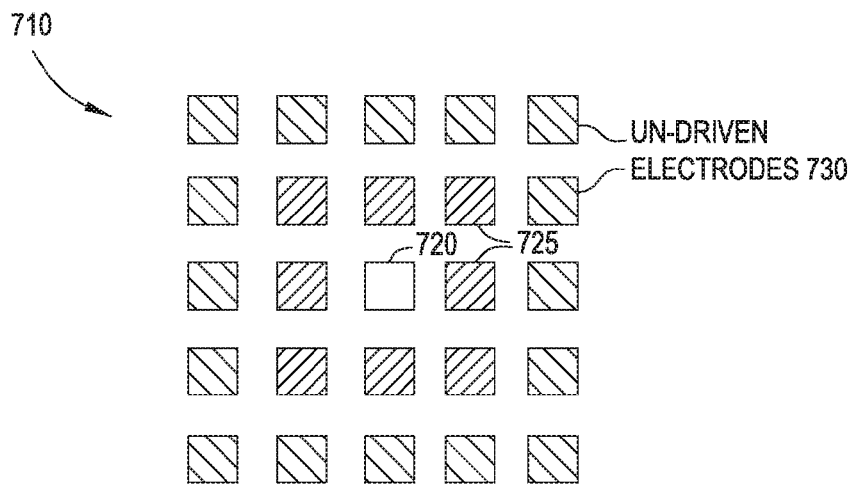
Figure 7C:
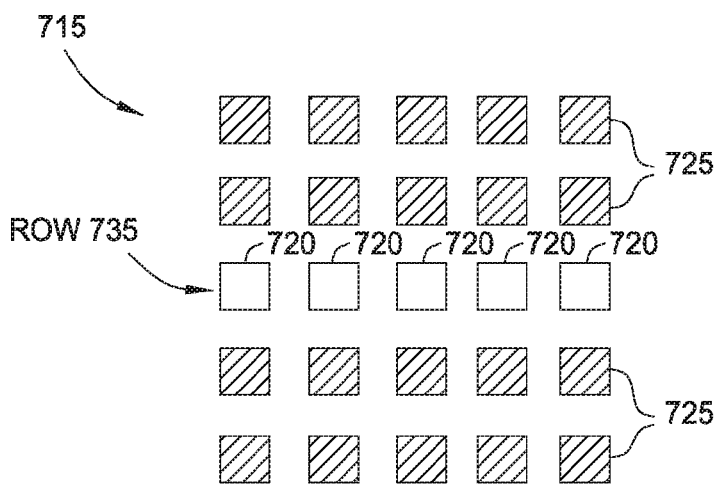

FIGS. 7A-7C illustrate sensing patterns for operating sensor electrodes in accordance with an embodiment of the invention. FIG. 7A illustrates a sensing pattern 705 where only one sensed electrode 720 is sensed during a READ phase. Stated differently, for each READ phase performed by the fingerprint sensor, the charge stored on only one of the sensor electrodes (i.e., sensed electrode 720) is measured. The fingerprint sensor may repeat the CHARGE, PRE-CHARGE, and READ phases to read from each one of the sensor electrodes. That is, the fingerprint sensor may raster through the sensor electrodes and perform respective CHARGE, PRE-CHARGE, and READ phases for each of the sensor electrodes in order to perform capacitive sensing.

The other sensor electrodes in the fingerprint sensor (i.e., the un-sensed electrodes 725 or the neighboring electrodes) are driven to the same voltages as the sensed electrode 720 to mitigate or prevent the coupling capacitances between the sensed electrode 720 and the un-sensed electrodes 725 from affecting the charge measurement performed on the sensed electrode 720 as described above. In this embodiment, all the sensor electrodes being sensed in the fingerprint sensor are driven to the same voltages as the sensed electrode 720.

FIG. 7B illustrates a sensing pattern 710 that is similar to the pattern 705 in FIG. 7A. In sensing pattern 710, only one sensor electrode is sensed during each iteration of the CHARGE, PRE-CHARGE, and READ phases. However, sensing pattern 710 is different than pattern 705 in that not all of the sensor electrodes in the fingerprint sensor are driven to the same voltages as the sensed electrode 720. As shown, only the sensor electrodes adjacent to the sensed electrode 720 (i.e., the un-sensed electrodes 725) are driven to the same voltages as the sensed electrode 720 as described in the timing chart shown in FIG. 5. However, the sensor electrodes (i.e., the un-driven electrodes 730) that surround the un-sensed electrodes 725 are not driven to the same voltages as the sensed electrode 720. Instead, the un-driven electrodes 730 may be electrically floating when the CHARGE, PRE-CHARGE, and READ phases are performed on the sensed electrode 720 and the un-sensed electrodes 725. For example, the switches 320 and 325 may be deactivated during these phases so that the un-driven electrodes 730 are not connected to a data line or the GND network. In another example, the un-driven electrodes 730 may remain coupled to GND during the CHARGE, PRE-CHARGE, and READ phases.

One reason for using the sensing pattern 710 rather than 705 is to save power. That is, the fingerprint may use less power (and extend battery life) by keeping the sensor electrodes that are further than the adjacent row and column of the sensed electrode 720 in a floating state. Although this may result in the capacitance coupling between the un-driven electrodes 730 and the sensed electrode 720 affecting the charge stored on the sensed electrode 720, the values of these capacitances may be too small to have a large effect on the charge accumulated on the sensed electrode 720. However, in another embodiment, the fingerprint sensor may drive the sensor electrodes in the first two or three concentric circles surrounding the sensed electrode 720 to the same voltages as the sensed electrode 720 rather than only the first concentric circle as shown in FIG. 7B. Any sensor electrodes outside of these first two or three concentric circles would be un-driven electrodes 730.

FIG. 7C illustrates a sensing pattern 715 where a row of sensor electrodes are sensed during each iteration of the CHARGE, PRE-CHARGE, and READ phases. As shown, each of the sensor electrodes in row 735 are sensed electrodes 720 where the charge accumulated on these electrodes 720 during the same CHARGE phase are measured in parallel by respective sensor modules. Put differently, the fingerprint sensor includes a sensor module (e.g., sensor module 204A shown in FIG. 4) for each column in the fingerprint sensor. Because the sensor electrodes in the same row are activated by the same select line (e.g., select line 305), the fingerprint sensor can charge, pre-charge, and read from all of the sensor electrodes in the row 735 in parallel. For example, referring back to the timing chart 500 in FIG. 5, during T5-T6, the fingerprint sensor may read from all the sensor electrodes in the same row as the sensor electrode 315A in parallel using respective sensor modules 204.

In one embodiment, however, the fingerprint sensor may read from a subset of the sensor electrodes in row 735 rather than all of the sensor electrodes as shown in FIG. 7C. For example, to reduce costs, multiple columns may be multiplexed to the same sensor module. For instance, the first two columns may be multiplexed to a first sensor module, the next two columns are multiplexed to a second sensor module, and so forth. Since a sensor module can read from only one sensor electrode at a time, the fingerprint sensor may read from only half of the sensor electrodes in row 735 during each iteration of the CHARGE, PRE-CHARGE, and READ phase. For example, during a first iteration, the odd sensor electrodes in row 735 are coupled to the multiplexed sensor modules, but during a second iteration, the even sensor electrodes in row 735 are coupled to the sensor modules. Of course, in other embodiments, the sensor modules may be selectively coupled to three, four, five, etc. columns of sensor electrodes by a multiplexor.

Figure 8:
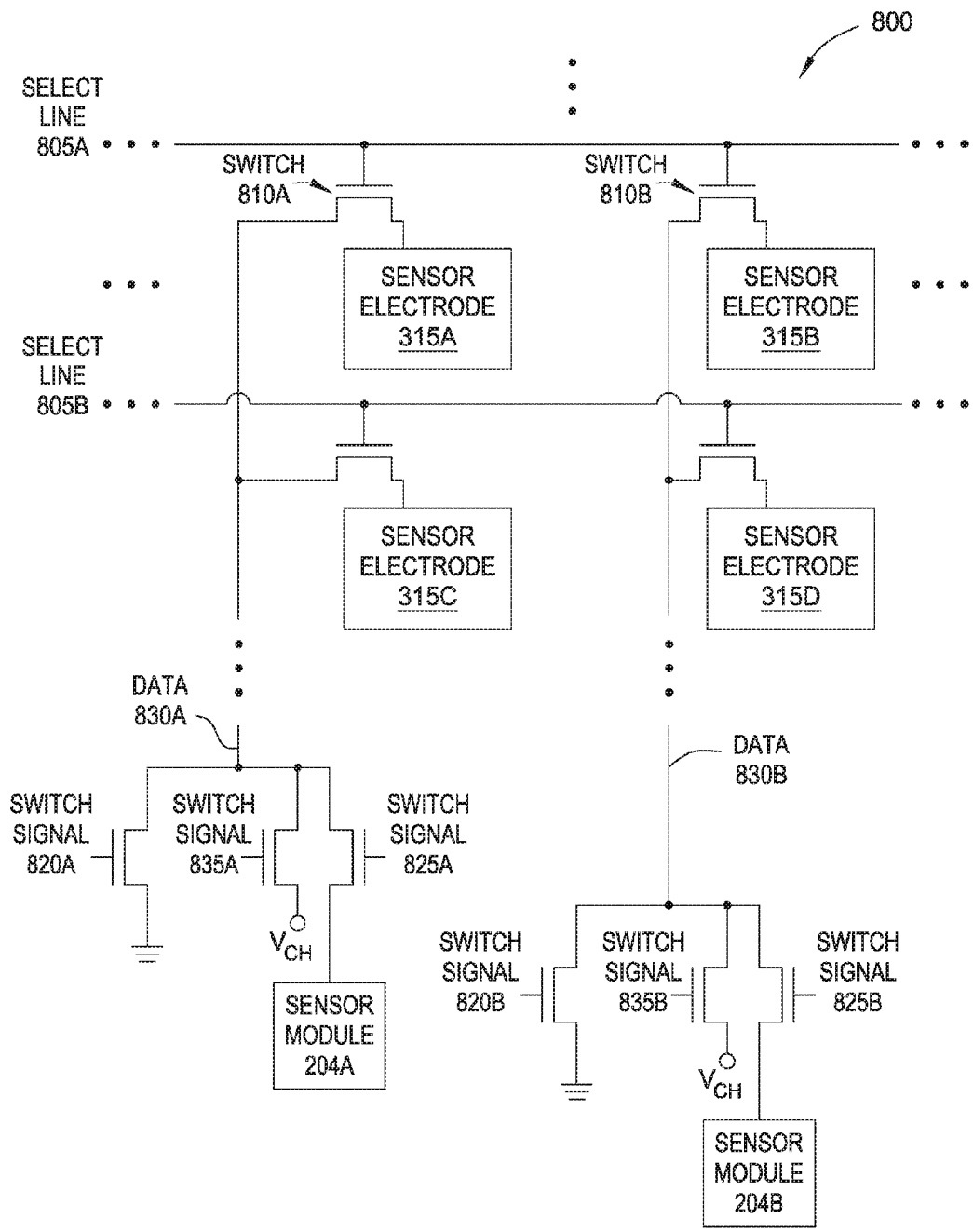
FIG. 8 illustrates a sensor layout for detecting an input object in accordance with an embodiment of the invention.

FIG. 8 illustrates a sensor layout for detecting an input object in a fingerprint sensor 800. Unlike fingerprint sensor 300 in FIG. 3, here, each sensor electrode 315 is controlled by only one select line 805. Put differently, if a particular row is inactive (i.e., the select line 805 is LOW), then the sensor electrodes cannot be coupled to GND unlike in fingerprint sensor 300 where the select line 305B can couple the sensor electrodes 315 in a row to the GND network. As shown, each sensor electrode 315 in a row is coupled to a respective data line 830 via a switch 810. If the select line 805 is HIGH, the switches 810 in the row are active and each of the sensor electrodes 315 is coupled to a respective data line 830. If the select line 805 is LOW, the switches 810 are inactive and the electrodes 315 in the row are electrically floating.

If sensing the upper row (i.e., the row containing sensor electrodes 315A and 315B), the select line 805A is active while the select line 805B is inactive. Thus, while sensing on the upper row, the neighboring electrodes 315C and 315D in the lower row are electrically floating—i.e., are disconnected from the data lines 330A and 330B.

Figure 9:
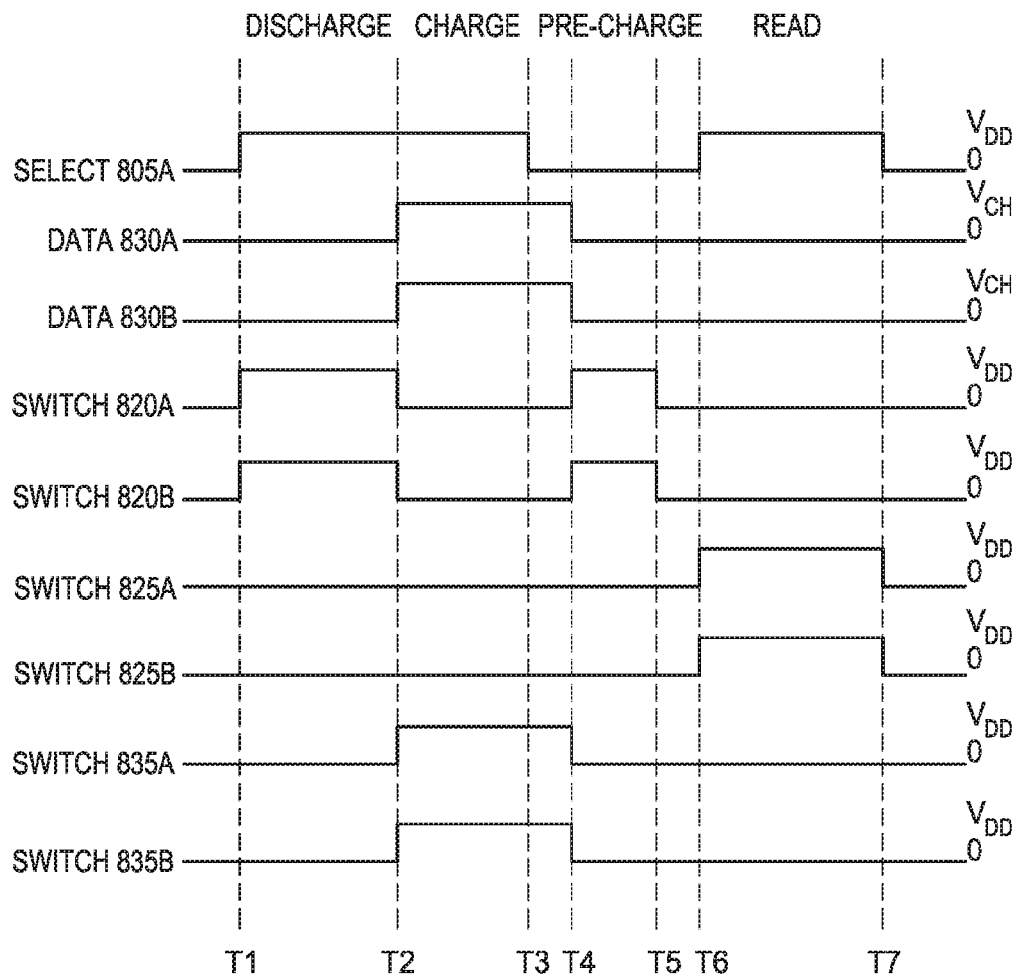
FIG. 9 is a timing diagram of the sensor layout in FIG. 8 in accordance with an embodiment of the invention.

FIG. 9 is a timing diagram 900 of the sensor layout in FIG. 8 in accordance with an embodiment of the invention. Specifically, timing diagram 900 illustrates DISCHARGE, CHARGE, LINE PRE-CHARGE, and READ phases for the sensor electrodes 315A and 315B in the upper row of the fingerprint sensor 800.

At time T1, any charge on the sensor electrodes 315A and 315B as well as the data lines 830 is removed by coupling these components to GND. To do so, the select line 805A is HIGH which couples the sensor electrodes 315A and 315B to their respective data lines 830A and 830B. Moreover, the switch signals 820A and 820B are also HIGH which couples these components to GND.

Although not shown in timing diagram 900, the select line 805B for the lower row may be HIGH which also couples the sensor electrodes 815C and 815D to the data lines 830A and 830B and to ground. Thus, any charge on these electrodes is also depleted.

At time T2, the select line 805A remains HIGH but the switch signals 820A and 830B are LOW thereby disconnecting the data lines 830A and 830B from GND. Moreover, the switch signals 835A and 835B are HIGH which couples the data lines 830A and 830B and sensor electrodes 315A and 315B to the charging voltage $V_{CH}$. Thus, during T2-T3, the sensor electrodes 315A and 315B are charged while the sensor electrodes in the neighboring rows—e.g., sensor electrodes 315C and 315D—remain floating. However, the switches 810 that couple the sensor electrodes 815 to the data lines 830 may be leaky. That is, even though the select line 805B for the lower row is LOW thereby deactivating the switches 810 in this row, the switches 810 may nonetheless permit some current to flow into the sensor electrodes 315C and 315D which causes charge to be stored on these sensor electrodes.

Moreover, the leakiness of the switches 810 may vary depending on the process corner in which the switches 810 were fabricated. That is, some switches 810 may leak more than others depending on where they are on the fingerprint sensor. Because these process variations may be unpredictable, the fingerprint sensor 800 may be unable to predict how much charge is stored on the "floating" sensor electrodes by the leakage current. Moreover, this leakage current and the resulting accumulated charge may cause the coupling capacitance between the upper row electrodes (i.e., the sensed electrodes) and the lower row of electrodes (i.e., the neighboring electrodes) to affect the amount of charge stored on the sensed electrodes during the CHARGE stage. That is, unlike in timing diagram 500 where the electrodes in the neighboring rows are driven to the same voltages, here, the electrodes 315C and 315D in the lower row may have a different voltage than the electrodes 315A and 315B in the upper row because of the leakage current of the switches 810 which may affect the charge accumulated on electrodes 315A and 315B.

In another embodiment, instead of electrically floating the neighboring electrodes during time T2, these electrodes may also be driven by to the charging voltage or coupled to the reference voltage (i.e., GND). For example, if only one electrode is being sensed (e.g., electrode 315A), the data lines 830 coupled to the neighboring electrodes on the same row as the sensed electrode may be attached to GND or the charging voltage. For neighboring electrodes in a different row (e.g., electrodes 315C and 315D), the selection line 805B may be HIGH thereby coupling these electrodes to either GND or the charging voltage rather than floating these electrodes during T2-T3.

At time T3, the select line 805A goes LOW while the data lines 830 remains coupled to charge voltage. At time T4, the switch signals 835A and 835B are switched to LOW, thereby disconnecting the data lines 830 from the charging voltage.

In parallel, the switch signals 820A and 820B go HIGH coupling the data lines 830A and 830B to GND which depletes any charge stored on the data lines 830. However, since the electrodes 315A and 315B are disconnected from the data lines 830, they continue to store the charge accumulated during the CHARGE phase. At time T5, the switch signals 820A and 820B go LOW which causes the data lines 830 and the sensor electrodes 315A and 315B to be electrically floating. Doing so may give time for the signals to settle before the READ phase begins.

At time T6, the select line 805A goes HIGH thereby coupling the sensor electrodes 315A and 315B to their respective data lines 830A and 830B. The switch signals 825A and 825B also go HIGH and connect the sensor electrodes 315A and 315B to the sensor modules 204A and 204B, respectively. As described above, the sensor modules 204 measure the amount of charge accumulated on the sensor electrodes 315A and 315B during the CHARGE phase. However, because of the leakage current in the switches 810, there may be some voltage difference between the sensor electrodes 315 in the upper row and the neighboring electrodes (which are not being sensed) which can affect the charge transferred from the sensor electrodes on the upper row to the feedback capacitors $C_{FB}$ in the sensor modules 204. Although the parasitic capacitance between the sensed electrodes and the neighboring electrodes in the fingerprint sensor 800 may affect the charge stored on the sensed electrodes, the sensor 800 may be cheaper to manufacture than the fingerprint sensor 300 illustrated in FIG. 3, and thus, may be preferred in some cases.

Although the timing diagram 900 illustrates measuring the charge from multiple sensor electrodes in parallel (i.e., both sensor electrode 315A and 315B), the fingerprint sensor 900 may also sense only one sensor electrode during each iteration of the CHARGE, PRE-CHARGE, and READ phases. For example, instead of coupling sensor electrode 315B to sensor module 204B during the READ phase, this electrode may be coupled to GND using the switch signal 820B. Thus, the sensor electrode 315B would be driven to the same voltages as sensor electrode 315A during the DISCHARGE, CHARGE, PRE-CHARGE, and READ phases, and thus, would not affect the charge stored on the sensor electrode 315A without having to measure the charge accumulated on the sensor electrode 315B. For example, instead of sensor electrodes 315A and 315B have respective sensor modules 204A and 204B, these electrodes may share the same sensor module 204. The sensor electrodes 315A and 315B can be driven in the same manner as shown in timing diagram 900 except that during the READ phase, data line 830B is coupled to GND using switch 820B while data line 830A is coupled to the sensor module 204 so the charge on sensor electrode 315A can be measured. During a subsequent iteration of the CHARGE, PRE-CHARGE, and READ phases, data line 830B is coupled to the shared sensor module 204 so the charge on sensor electrode 315B can be measured while data line 830A is coupled to GND using switch signal 820A. In this manner, the fingerprint sensor 800 can measure the charge stored on a single sensor electrode in a row or a subset of the sensor electrodes in the row during a single iteration of the CHARGE, PRE-CHARGE, and READ phases.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A processing system for performing capacitive sensing, the processing system comprising:
   selection logic configured to apply, during a first time period, a charging voltage to a first sensor electrode and a second sensor electrode, wherein the second sensor electrode neighbors the first sensor electrode in a sensor electrode matrix, wherein the sensor electrode matrix comprises a plurality of sensor electrodes forming rows and columns on a common plane, wherein the plurality of sensor electrodes comprises the first and second sensor electrodes; and
   a sensor circuit configured to measure, during a second time period, a first charge stored on the first sensor electrode resulting from applying the charging voltage, wherein the selection logic is configured to bias the second sensor electrode to a reference voltage during the second time period.

2. The processing system of claim 1, wherein a second charge stored on the second sensor electrode resulting from applying the charging voltage during the first time period is not measured by the processing system during the second time period.

3. The processing system of claim 1, wherein there is no voltage difference between the first and second sensor electrodes at the ends of the first and second time periods, and wherein each of the rows and each of the columns contain at least two of the plurality of sensor electrodes.

4. The processing system of claim 1, wherein an amount of the first charge stored on the first sensor electrode is based on a coupling capacitance between the first sensor electrode and an input object.

5. The processing system of claim 1, wherein sensor electrodes in the sensor electrode matrix have a pitch suitable for distinguishing between features of a fingerprint.

6. The processing system of claim 1, wherein the first and second sensor electrodes are in a same row in the sensor electrode matrix.

7. The processing system of claim 1, wherein the selection logic is configured to apply, during the first time period, the charging voltage to a third sensor electrode neighboring the first sensor electrode in the sensor electrode matrix, wherein the processing system further comprises:
   a different sensor circuit configured to measure, during the second time period, a third charge stored on the third sensor electrode resulting from applying the charging voltage, wherein the first and third sensor electrodes are in a same row in the sensor electrode matrix.

8. The processing system of claim 7, wherein the sensor circuit is selectively coupled to sensor electrodes in at least two columns in the sensor electrode matrix, wherein the first sensor electrode is selectively coupled to the sensor circuit while the third sensor electrode is selectively coupled to the different sensor circuit and the first and third charges in the first and third sensor electrodes are measured in parallel.

9. The processing system of claim 1, wherein the selection logic is configured to:
   bias data lines to the reference voltage during a third time period, wherein the third time period occurs between the first and second time periods, wherein the data lines respectively coupled the first and second sensor electrodes to the selection logic.

10. An input device, comprising:
    a plurality of sensor electrodes arranged in a matrix comprising a plurality of sensor electrodes forming rows and columns on a common plane;
    a processing system configured to:
      apply, during a first time period, a charging voltage to a first sensor electrode of the plurality of sensor electrodes and a second sensor electrode of the plurality of sensor electrodes, wherein the second sensor electrode neighbors the first sensor electrode in the matrix,
      measure, during a second time period, a first charge stored on the first sensor electrode resulting from applying the charging voltage, and
      bias the second sensor electrode to a reference voltage during the second time period.

11. The input device of claim 10, wherein a second charge stored on the second sensor electrode resulting from applying the charging voltage during the first time period is not measured by the processing system during the second time period.

12. The input device of claim 10, wherein there is no voltage difference between the first and second sensor electrodes at the ends of the first and second time periods.

13. The input device of claim 10, wherein the plurality of sensor electrodes form a fingerprint sensor array, wherein each of the rows and each of the columns contain at least two of the plurality of sensor electrodes.

14. The input device of claim 10, further comprising:
    a first row select line configured to activate a first switch coupling the second sensor electrode to the charging voltage; and
    a second row select line configured to activate a second switch coupling the second sensor electrode to the reference voltage.

15. The input device of claim 14, wherein the first switch and second switch comprise respective thin-film-transistors (TFT).

16. The input device of claim 14, further comprising:
    a third row select line configured to activate a third switch coupling the first sensor electrode to the charging voltage and a sensor circuit; and
    a fourth row select line configured to activate a fourth switch coupling the first sensor electrode to the reference voltage, wherein the first and second sensor electrodes are disposed in different rows in the matrix.

17. A method for performing capacitive sensing, the method comprising:
    applying, during a first time period, a charging voltage to a first sensor electrode and to a second sensor electrode neighboring the first sensor electrode in a sensor electrode matrix, wherein the sensor electrode matrix comprises a plurality of sensor electrodes forming rows and columns on a common plane, wherein the plurality of sensor electrodes comprises the first and second sensor electrodes;
    measuring, during a second time period, a first charge stored on the first sensor electrode resulting from applying the charging voltage; and
    biasing the second sensor electrode to a reference voltage during the second time period.

18. The method of claim 17, wherein a second charge stored on the second sensor electrode resulting from applying the charging voltage during the first time period is not measured during the second time period.

19. The method of claim 17, further comprising:

applying, during the first time period, the charging voltage to a third sensor electrode neighboring the first sensor electrode in the sensor electrode matrix; and measuring, during the second time period, a third charge stored on the third sensor electrode resulting from applying the charging voltage, wherein the first and third sensor electrodes are in a same row in the sensor electrode matrix.

20. The method of claim 17, further comprising:

disconnecting the first and second sensor electrodes from respective data lines coupling the first and second sensor electrodes to a voltage source providing the charging voltage during a third time period, wherein the third time period occurs between the first and second time periods, and wherein the first and second sensor electrodes are electrically floating during the third time period; and biasing the respective data lines the reference voltage during the third time period.

21. An input device, comprising:

a plurality of sensor electrodes arranged in a matrix;

first and second row select lines selectively coupling first and second sensor electrodes in the matrix to a first data line; and a processing system configured to:

apply, during a first time period, a charging voltage to the first sensor electrode using the first data line, apply, during the first time period, the charging voltage to a third sensor electrode in the matrix using a second data line; and measure, during a second time period, a charge stored on the first sensor electrode resulting from applying the charging voltage using the first data line, wherein the second sensor electrode and third sensor electrode are electrically floating during the second time period.

* * * * *